Sept. 22, 1964 G. E. SCHEITLIN 3,149,925
CATALYTIC CONVERTER
Filed Sept. 14, 1961 3 Sheets-Sheet 1
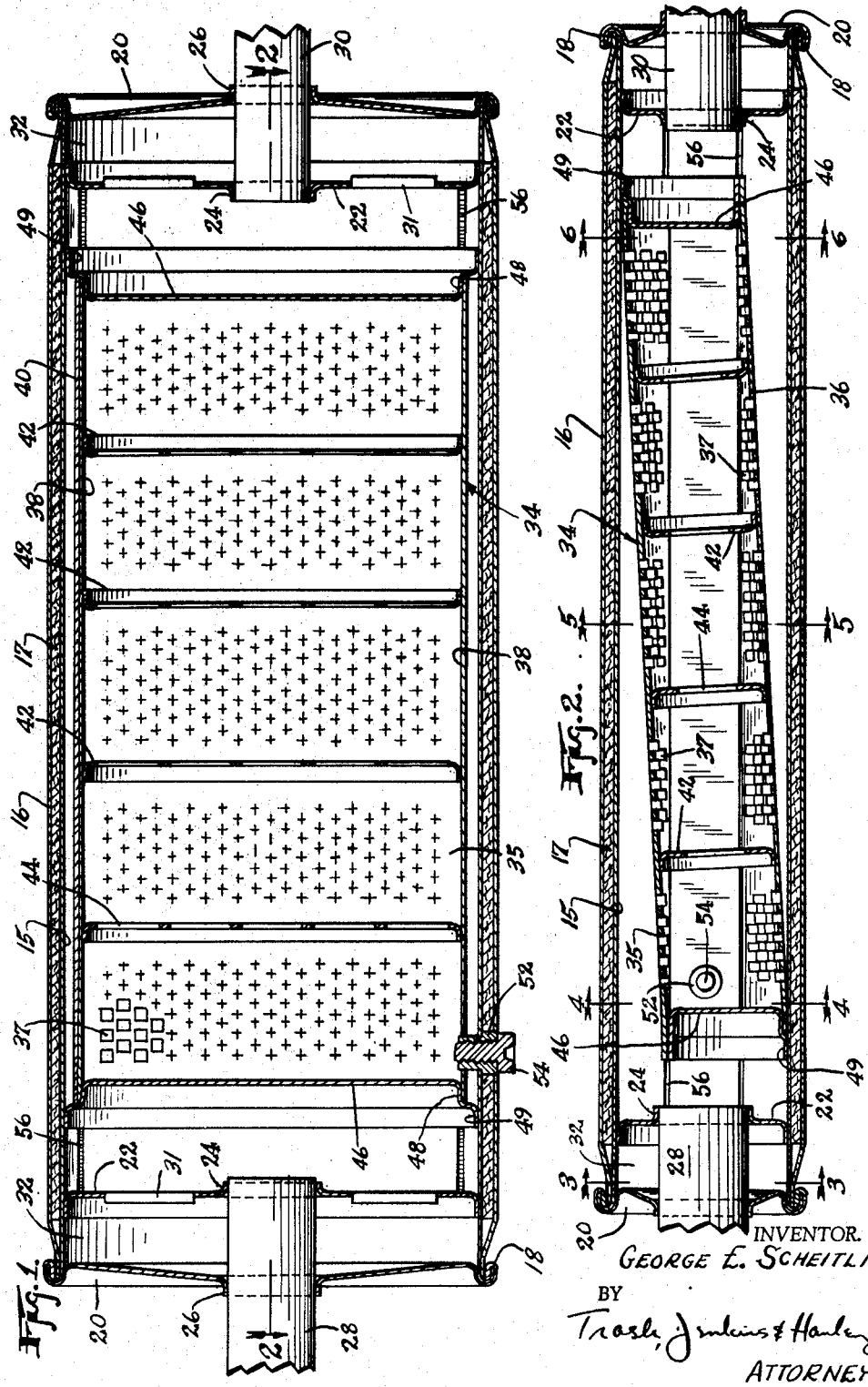
INVENTOR.
GEORGE E. SCHEITLIN,
BY
Trask, Jenkins & Hanley
ATTORNEYS.

Sept. 22, 1964   G. E. SCHEITLIN   3,149,925
CATALYTIC CONVERTER
Filed Sept. 14, 1961   3 Sheets-Sheet 2
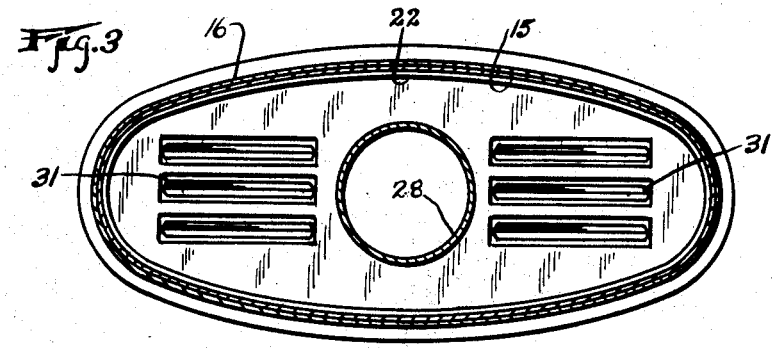
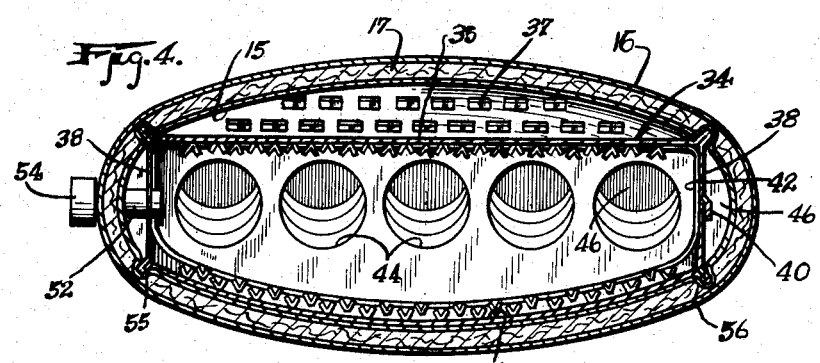
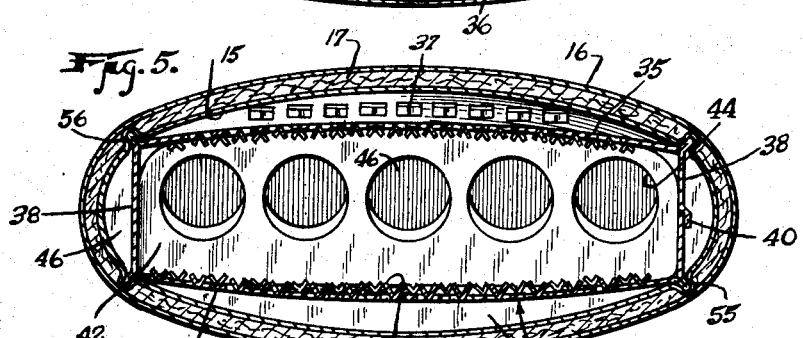
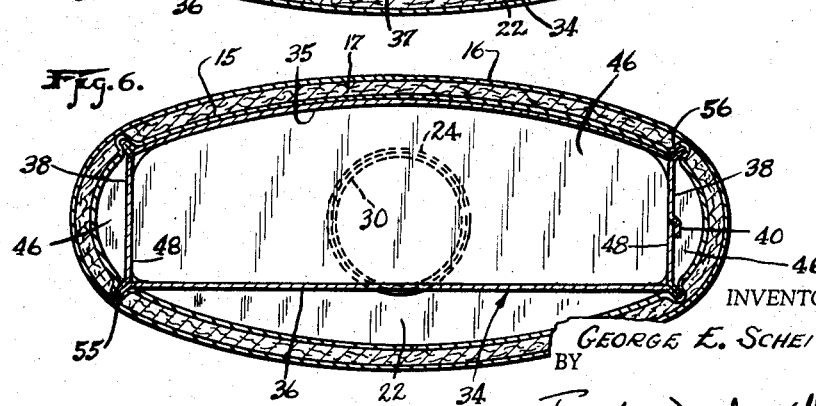
INVENTOR.
GEORGE E. SCHEITLIN,
BY Trask, Jenkins & Hanley
ATTORNEYS.

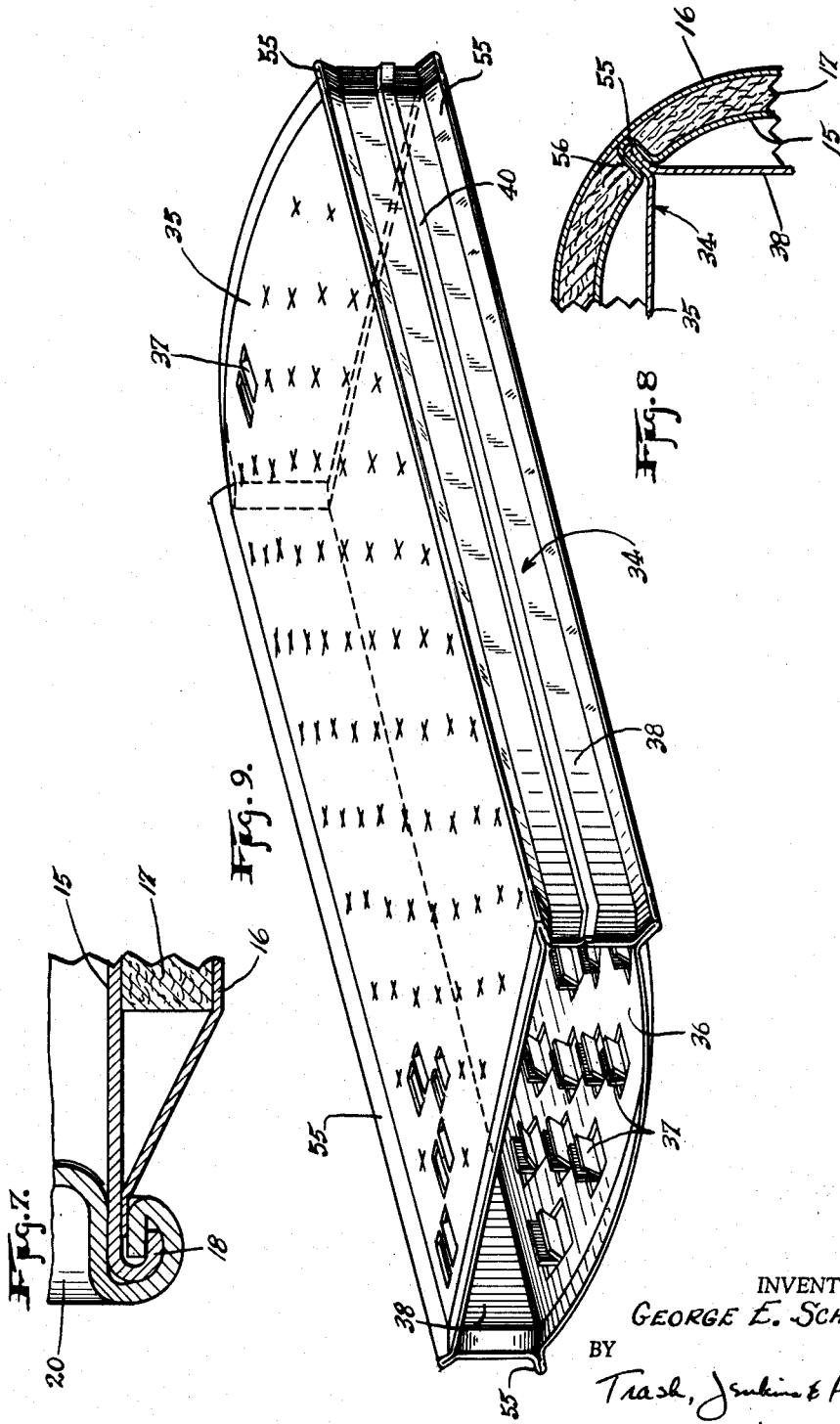

United States Patent Office 3,149,925
Patented Sept. 22, 1964

3,149,925
CATALYTIC CONVERTER
George E. Scheitlin, Columbus, Ind., assignor to Arvin Industries, Inc., Columbus, Ind., a corporation of Indiana
Filed Sept. 14, 1961, Ser. No. 138,049
9 Claims. (Cl. 23—288)

This invention relates to a catalytic converter for exhaust gases, and more particularly to a catalytic converter for removing the undesirable components present in the exhaust gases emanating from an internal combustion engine.

The combustion of fuel in an internal combustion engine, particularly in the internal combustion engines in automobiles, is incomplete, thereby causing a high percentage of unburned hydrocarbons and carbon monoxide to be discharged from the engine with the exhaust gases. These hydrocarbons and carbon monoxide when introduced into the atmosphere in sufficient quantities produce an atmospheric condition referred to as smog. It has been found, however, that these smog-producing pollutants can be removed from the exhaust gases by certain chemical and/or thermal treatments of the exhaust gases.

It is therefore the general object of my invention to provide a catalytic converter which will remove the smog-producing pollutants from the exhaust gases of an internal combustion engine in an automotive vehicle. It is a specific object of my invention to provide a catalytic converter which will remove a high percentage of the undesirable pollutants in an exhaust gas stream, which will hold a large quantity of material for converting said pollutants to non-noxious by-products, which will have limited space requirements, and which will produce minimal back pressures. It is a further object of my invention to provide such a catalytic converter which can be economically manufactured largely from sheet-metal, which will prove sturdy and durable in use, and which will provide a uniform gas-flow to insure effective removal of the undesirable pollutants in an exhaust gas stream.

In accordance with the preferred form of my invention, there is provided an elongated shell closed at each of its ends and having gas inlet and outlet conduits in open communication with its interior adjacent its opposed ends. A conversion chamber is mounted in said shell and is adapted to hold a catalytic material for removing the noxious pollutants from exhaust gases. Said conversion chamber extends obliquely across the interior of the shell to abut the inner face of said shell along diagonally opposed lines of contact. Conveniently, said chamber is provided with perforated inlet and outlet wall surfaces disposed in opposed relationship, and with said chamber being mounted diagonally within the shell, the space between the inlet wall surface and the adjacent shell wall generally progressively decreases in volume and the space between the outlet wall surface of said chamber and the adjacent shell wall generally progressively increases in volume from the end of the chamber adjacent the inlet conduit to the end of the chamber adjacent the outlet conduit. In this manner, the conversion chamber cross-braces the shell to give it added rigidity and further provides a controlled rate of flow of the exhaust gases through the converter to insure the conversion of a high percentage of the noxious pollutants in the gases into non-noxious components.

Other objects and features of my invention will become apparent from the more detailed description which follows and from the accompanying drawings in which:

FIG. 1 is a longitudinal horizontal section taken on the medial axis of a catalytic converter embodying my invention;

FIG. 2 is a longitudinal vertical section taken on the line 2—2 of FIG. 1;

FIG. 3 is a vertical section taken on the line 3—3 of FIG. 2;

FIG. 4 is a vertical section taken on the line 4—4 of FIG. 2;

FIG. 5 is a vertical section taken on the line 5—5 of FIG. 2;

FIG. 6 is a vertical section taken on the line 6—6 of FIG. 2;

FIG. 7 is a fragmentary enlarged section of the converter shell showing the interconnection between the shell side walls and an end cap;

FIG. 8 is a fragmentary enlarged section showing the method of interconnection between the conversion chamber and the shell side walls; and FIG. 9 is an enlarged isometric view of the conversion chamber shown in FIG. 1.

As shown in FIGS. 1 and 2, my converter is housed in an elongated shell construction having inner and outer side walls 15 and 16 disposed in spaced relationship with a layer of thermal insulation 17 interposed therebetween. Conveniently, for strength and economy of space, the shell walls 15 and 16 are in the form of concentric closed curves, an ellipse as shown. As illustrated in FIG. 7, the ends of the shell side walls 15 and 16 abut each other and are rigidly connected as by common roll seams 18 to a pair of end caps 20 closing the opposed ends of the shell.

A pair of baffle plates 22 are mounted within the shell slightly inwardly from the end caps 20. Each of said baffle plates is provided with a shouldered aperture 24 disposed in axial alignment with a shouldered aperture 26 formed in each of the end caps 20, the aligned openings 26 and 24 in one of the end caps 20 and its adjacent baffle plate 22 supporting an inlet conduit 28 and the aligned openings 26 and 24 in the opposite end cap 20 and its adjacent baffle plate 22 supporting an outlet conduit 30. As shown, each of the baffle plates 22 is provided with a plurality of louvered openings 31, and the inlet and outlet conduits 28 and 30 terminate inwardly of said baffle plates, whereby the spaces between said baffle plates and their adjacent end caps 20 form a pair of sound attenuating chambers 32 at the opposite ends of the converter.

Interposed between the baffle plates 22 is a conversion chamber 34 illustrated in FIG. 9. As shown, said conversion chamber comprises an upper inlet wall surface 35 and an opposed lower outlet wall surface 36, each of said wall surfaces being provided with a plurality of louvered openings 37. Conveniently, the wall surfaces 35 and 36 are integrally connected to a pair of opposed generally rectangularly shaped side walls 38, with the ends of the metal forming the said wall surfaces and side walls being secured together by a welded lap seam 40. The end walls of the chamber are formed from a pair of end plates 46, each of which is provided with an inwardly offset shoulder 48 received against the inner faces of the chamber side walls 38 and the inlet and outlet wall surfaces 35 and 36, and a peripheral flange 49 received against the inner shell wall 15.

As shown in FIG. 9, the inlet wall surface 35 and the outlet wall surface 36 have opposed congruent configurations. Each of said wall surfaces has an arcuate cross-section adjacent one of its ends corresponding to the curvature of the shell side wall 15, which arcuate cross-section progressively flattens out toward the opposite end of the wall surface into coplanarity. Similarly, the shoulder 48 on each of the end plates 46 has a rectilinear edge which abuts and is secured to the coplanar edge of one of the wall surfaces 35 or 36, and a curved edge which abuts and is secured to the arcuate edge of the other wall surface. A plurality of transversely extending braces 42 having configurations corresponding to the cross-sectional configuration of the chamber 34 and provided with openings 44 are rigidly secured to the inner faces of the chamber inlet and outlet wall surfaces 35 and 36 and side walls 38.

Because of the curvature of the shell side walls 15, the chamber side walls 38 are spaced from the shell side walls and thus provide insulating air spaces along the sides of the chamber. These insulating air spaces are closed by the laterally disposed portions of the end plates 46 extending between the chamber 34 and the inner face of the shell side wall 15. Such interengagement of the end plates and shell further serves to direct the exhaust gas flow from the inlet conduit to the inlet wall surface 35 and from the outlet wall surface 36 to the outlet conduit 30.

The chamber 34 is adapted to hold a catalytic material which effects conversion of the noxious pollutants in the exhaust gases into non-noxious components. Such catalysts are normally available in pellet form, but the small size of the louvered openings 37 in the inlet and outlet wall surfaces 35 and 36 prevents the pellets from falling out of the converter. Conveniently, to fill the chamber 34 with catalyst I provide a fill tube 52 mounted in the shell walls 15 and 16 and extending through one of the chamber side walls 38, said fill tube being closable by a screw cap 54. Thus, to fill the conversion chamber with catalyst, it is merely necessary to remove the cap 54 and pour the catalyst into the chamber 34 through the fill pipe 52, the openings 44 in the braces 42 permitting said material to flow through the entire conversion chamber to fill it.

As shown in FIG. 2, the conversion chamber 34 is mounted in the converter shell in a tilted obliquely extending position with its end plates 46 being spaced inwardly from the inlet and outlet conduits 28 and 30. As previously explained, said chamber may be formed as a sub-assembly and inserted into the shell. To this end, the metal forming the edges of chamber side walls 38 and inlet and outlet wall surfaces 35 and 36 is crimped together to form beads 55 projecting obliquely outwardly from the chamber 34 along its length. Said beads are received in inwardly open grooves 56 formed in the shell side wall 15. Conveniently, the grooves 56 have a longitudinal extent corresponding to the distance between the opposed shell end walls 46 so that a proper longitudinal positioning of the conversion chamber in the converter shell is assured.

Because of their diagonally opposed arcuate configurations, the converter inlet and outlet wall surfaces 35 and 36 and the chamber end plates 46, will abut arcuate segments of converter shell on diagonally opposed lines of contact to give added rigidity to the converter shell. The tilted mounting of the chamber 34 within the shell further causes the space between the chamber inlet wall surface 35 and the adjacent portion of the shell wall 15 to become progressively smaller from the inlet conduit 28 toward the outlet conduit 30 and the space between the outlet wall surface 36 and the inner shell wall 15 to become progressively larger from the inlet conduit 28 to the outlet conduit 30. This reduction in space on the inlet side of the chamber and increase in space on the outlet side of said chamber insures a more uniform gas flow through the chamber. Further, the opposed arcuate configurations of said inlet and outlet walls 35 and 36 give the conversion chamber a maximum thickness along its longitudinal axis where the majority of the gases will enter and leave the chamber 34 thus further assuring a high efficiency of conversion. This tilted mounting of the chamber in the converter shell coupled with the spacing between the chamber side walls 38 and the side wall portions of the shell provides insulating air spaces extending substantially continuously around the conversion chamber.

In order to supply the catalyst with combustion air and control the temperature of said catalyst, it may be desirable to provide means for introducing air into the exhaust gas stream and for by-passing said stream around the converter. Such auxiliary means, however, may be employed as desired and constitutes no part of the instant invention.

While I have illustrated my invention as employing an elliptically shaped shell, it is to be understood that any shell configuration may be employed in my invention.

I claim as my invention:

1. In a catalytic converter for removing noxious pollutants from an exhaust gas stream, an elongated shell having side walls in the form of a closed curve, means closing the ends of said shell, gas inlet and outlet conduits in open communication with the interior of said shell adjacent its opposed ends, and an elongated conversion chamber adapted to hold a catalytic material for removing the noxious pollutants from exhaust gases mounted in said shell and extending obliquely thereacross, said chamber having opposed first and second wall surfaces, one end of said first wall surface being curved to abut an arcuate segment of the inner shell face adjacent said outlet conduit and the opposite end of said first wall surface being spaced from the inner shell face adjacent said inlet conduit, one end of said second wall surface being curved to abut an arcuate segment of the inner shell face adjacent the inlet conduit and the opposite end of said second wall surface being spaced from the inner shell face adjacent said outlet conduit, said chamber being perforated within the extent of said first and second wall surfaces.

2. In a catalytic converter for removing noxious pollutants from an exhaust gas stream, an elongated shell having side walls in the form of a closed curve, means closing the ends of said shell, gas inlet and outlet conduits in open communication with the interior of said shell adjacent its opposed ends, and an elongated conversion chamber adapted to hold a catalytic material for removing noxious pollutants from exhaust gases mounted in said shell and extending obliquely thereacross, said chamber comprising opposed perforated inlet and outlet walls interconnected by imperforate side and end walls, said inlet and outlet walls being curved to abut the face of the shell adjacent the outlet and inlet conduits respectively, and spaced from said inner shell wall adjacent said inlet and outlet conduits respectively, said chamber end walls abutting said inner shell face to direct gas from said inlet conduit into the chamber through said inlet wall.

3. The invention as set forth in claim 2 in which each of said end walls has a rectilinear edge and the ends of said inlet and outlet walls adjacent said inlet and outlet conduits respectively are rectilinear and are secured to the rectilinear edges of said end walls.

4. The invention as set forth in claim 2 in which said chamber end walls comprise a pair of parallel walls at the opposite ends of said chamber abutting said inner shell face and said chamber side walls comprise a pair of parallel walls extending along the opposed sides of said chamber with the major portions thereof spaced from said inner shell face.

5. In a catalytic converter for removing noxious pollutants from an exhaust gas stream, an elongated shell having side walls in the form of a closed curve, means closing the ends of said shell, gas inlet and outlet conduits in open communication with the interior of the shell adjacent its opposed ends, and an elongated conversion chamber adapted to hold a catalytic material for removing noxious pollutants from exhaust gases mounted in said shell and extending obliquely thereacross, said chamber comprising opposed perforate inlet and outlet walls interconnected by imperforate side and end walls, said inlet and outlet walls respectively having arcuate cross-section corresponding to the curvature of the shell adjacent the inlet and outlet conduits, each of said arcuate cross-sections progressively flattening toward the opposed ends of said walls into coplanarity, and a plurality of perforated transversely extending braces rigidly secured to the opposed inwardly presented faces of said inlet and outlet walls, said chamber end walls abutting diagonally opposed segments of the inwardly presented face of said shell to direct gas from said inlet conduit into said chamber through said inlet wall.

6. In a catalytic converter for removing noxious pollutants from an exhaust gas stream, an elongated shell having inner and outer side walls in the form of generally concentric closed curves, end caps rigidly secured to said inner and outer side walls and closing the ends of said shell, gas inlet and outlet conduits in open communication with the interior of said shell adjacent its opposed ends, and an elongated conversion chamber adapted to hold a catalytic material for removing the noxious pollutants from exhaust gases mounted in said shell and extending obliquely thereacross, said chamber comprising opposed perforate inlet and outlet walls interconnected by imperforate side and end walls, said inlet and outlet walls respectively having arcuate cross-sections corresponding to the curvature of the inner shell side wall adjacent the inlet and outlet conduits, each of said arcuate cross-sections progressively flattening out toward the opposed ends of said walls into coplanarity, said chamber end walls abutting diagonally opposed segments of the inner shell side wall to direct exhaust gas flow from said inlet conduit into the chamber through said inlet wall, and a plurality of elongated outwardly projecting ribs on said chamber received in corresponding grooves formed in said inner shell side wall.

7. The invention as set forth in claim 6 in which said chamber side walls are generally rectangular and said ribs project outwardly from their longitudinal edges.

8. In a catalytic converter for removing noxious pollutants from an exhaust gas stream, an elongated shell having inner and outer side walls in the form of generally concentric closed curves, insulating material interposed between said side walls, end caps rigidly secured to said inner and outer side walls and closing the ends of said shell, baffle plates mounted within said shell adjacent said end caps to form a pair of sound attenuating chambers adjacent the ends of said shell, gas inlet and outlet conduits mounted in the end caps and baffle plates at the opposite ends of said shell, and an elongated conversion chamber adapted to hold a catalytic material for removing noxious pollutants from exhaust gases mounted in said shell in spaced relation to said baffle plates and extending obliquely across said shell, said chamber comprising opposed perforate inlet and outlet walls interconnected by imperforate side and end walls, said inlet and outlet walls respectively having arcuate cross-sections corresponding to the curvature of the inner shell side wall adjacent the inlet and outlet conduits, each of said arcuate cross-sections progressively flattening out toward the opposed ends of said walls into co-planarity, said chamber end walls abutting diagonally opposed segments of the inner shell side wall to direct exhaust gas flow from said inlet conduit into the chamber through said inlet wall, and a plurality of elongated outwardly projecting ribs on said chamber received in corresponding grooves formed in said inner shell side wall.

9. In a catalytic converter for removing noxious pollutants from an exhaust gas stream, an elongated shell having side walls in the form of a closed curve, means closing the ends of said shell, gas inlet and outlet conduits in open communication with the interior of the shell adjacent its opposed ends, and a conversion chamber extending obliquely across said shell and adapted to hold a catalytic material for removing the noxious pollutants from exhaust gases, said conversion chamber having top and bottom walls extending obliquely across said shell whereby the space between said top wall and the adjacent shell wall generally progressively decreases in volume and the space between said bottom wall surface and the adjacent shell wall generally progressively increases in volume from the end of the chamber adjacent the inlet conduit to the end of the chamber adjacent the outlet conduit, said top and bottom walls respectively having arcuate cross-sections corresponding to the curvature of the shell adjacent the inlet and outlet conduits with said arcuate cross-sections progressively flattening toward the opposed ends of said walls into coplanar areas, end walls interconnecting the adjacent ends of said top and bottom walls and abutting diagonally opposed segments of said shell, side walls interconnecting the adjacent longitudinal edges of said top and bottom walls and having at least the major portions of their extents spaced from said shell, said chamber having perforations formed in said top and bottom walls, and means rigidly connecting said chamber to said shell.

References Cited in the file of this patent
UNITED STATES PATENTS

| | | |
|---|---|---|
| 1,695,554 | Markels | Dec. 18, 1928 |
| 2,071,119 | Harger | Feb. 16, 1937 |
| 2,204,447 | Samans | June 11, 1940 |
| 2,329,847 | McCausland | Sept. 21, 1943 |
| 2,614,033 | Cornell et al. | Oct. 14, 1952 |
| 2,639,224 | McAfee | May 19, 1953 |
| 2,772,147 | Bowen et al. | Nov. 27, 1956 |
| 2,807,930 | Bratton | Oct. 1, 1957 |
| 2,828,189 | Houdry | Mar. 25, 1958 |
| 2,834,657 | Houdry | May 13, 1958 |
| 2,853,367 | Karol et al. | Sept. 23, 1958 |
| 2,928,492 | Nelson | Mar. 15, 1960 |